United States Patent
McLaughlin et al.

(10) Patent No.: US 9,373,872 B2
(45) Date of Patent: Jun. 21, 2016

(54) PROTECTIVE BATTERY CELL PLATES

(71) Applicant: GM GLOBAL TECHNOLOGY OPERATIONS LLC, Detroit, MI (US)

(72) Inventors: Barton W. McLaughlin, Troy, MI (US); Todd H. Fast, Huntington Woods, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 412 days.

(21) Appl. No.: 13/898,063

(22) Filed: May 20, 2013

(65) Prior Publication Data

US 2014/0342199 A1    Nov. 20, 2014

(51) Int. Cl.
*H01M 10/613* (2014.01)
*H01M 2/14* (2006.01)
*H01M 10/625* (2014.01)
*H01M 10/6556* (2014.01)

(52) U.S. Cl.
CPC ............ *H01M 10/5004* (2013.01); *H01M 2/14* (2013.01); *H01M 10/613* (2015.04); *H01M 10/625* (2015.04); *H01M 10/6556* (2015.04); *H01M 2200/20* (2013.01)

(58) Field of Classification Search
CPC .................................................... H01M 4/587
See application file for complete search history.

(56) References Cited

U.S. PATENT DOCUMENTS

| | | | |
|---|---|---|---|
| 9,065,158 B2* | 6/2015 | Martz et al. | |
| 2001/0007728 A1* | 7/2001 | Ogata et al. | 429/120 |
| 2004/0062995 A1* | 4/2004 | Yanagida et al. | 429/331 |
| 2007/0037051 A1* | 2/2007 | Kim et al. | 429/151 |
| 2009/0142628 A1* | 6/2009 | Okada | H01M 2/0237 429/8 |
| 2009/0255109 A1* | 10/2009 | Weber | H01M 2/14 29/623.2 |
| 2009/0325065 A1* | 12/2009 | Fujii et al. | 429/199 |
| 2012/0040226 A1* | 2/2012 | Kim et al. | 429/120 |
| 2012/0129024 A1* | 5/2012 | Marchio et al. | 429/87 |

* cited by examiner

*Primary Examiner* — Patrick Ryan
*Assistant Examiner* — Alex Usyatinsky
(74) *Attorney, Agent, or Firm* — Philips Ryther & Winchester; Matthew D. Thayne

(57) ABSTRACT

Apparatus for protecting battery cells. In some embodiments, a battery may comprise a series of battery cells and one or more protective plates positioned between the adjacent battery cells. In some embodiments, the plates may also be configured to provide a cooling function relative to adjacent battery cells. The plate(s) may comprise a first section and a second section coupled with the first section. The plate may be configured to fail under predetermined conditions such that, upon experiencing the predetermined conditions, at least a portion of the second section is configured to separate from at least a portion of the first section.

9 Claims, 3 Drawing Sheets

PROTECTIVE BATTERY CELL PLATES

TECHNICAL FIELD

This disclosure relates to apparatus for protecting battery cells, such as battery cell plates. For example, in some embodiments, this disclosure relates to battery cell cooling plates configured to fail under certain conditions to prevent excessive forces from being transferred to one or more battery cells.

BACKGROUND

Batteries are often manufactured with a series of battery cells, which may be prismatic in shape to facilitate a stacking of the battery cells. Such configurations are particularly common for use in electric vehicles. Typical prismatic battery cells, such as lithium-ion battery cells, often generate significant heat during operation and during recharging. When overheated or otherwise exposed to high-temperatures, undesirable effects can impact the operation of such batteries.

As such, batteries comprising a series of battery cells may comprise one or more battery cooling plates which may be used to dissipate heat from the cells in order to prevent or at least reduce the incidence of heat damage.

In addition, such batteries may be sensitive to certain forces, such as may be experienced during a vehicle crash or other impact. Indeed, some such batteries may be destroyed or otherwise have their functionality altered in undesirable ways as a result of such impacts.

The present inventors have therefore determined that it would be desirable to provide protective plates configured for absorbing forces to prevent excessive forces from being transferred between cells. Such plates may, in some embodiments, further be configured to dissipate heat from or otherwise cool the battery cells. The present inventors have proposed various embodiments in order to overcome one or more of the aforementioned limitations and/or other limitations of the prior art, as described in detail below.

SUMMARY

Apparatus are disclosed herein for protecting battery cells, such as battery cell plates. Some embodiments may be particularly useful in connection with vehicle batteries comprising a series of battery cells. Some embodiments may be used to both cool such battery cells and to provide protection by, for example, being configured to fail under certain conditions to prevent excessive forces from being transferred to one or more battery cells within the battery.

In some embodiments, one or more plates may be provided for protecting one or more cells of a battery. Each such plate may comprise a first section configured to contact a first battery cell, and a second section coupled with the first section. The plate may be configured to fail under predetermined conditions—such as experiencing a threshold force—such that, upon experiencing the predetermined conditions, at least a portion of the second section is configured to separate from at least a portion of the first section.

In some embodiments, at least a portion of the first section may be offset from at least a portion of the second section such that, upon experiencing the predetermined conditions, the at least a portion of the first section is configured to shear relative to the at least a portion of the second section. The second section may be coupled to the first section at an overlapping section. A cross-section of the overlapping section may comprise a first portion of the first section and a first portion of the second section. The overlapping section may further comprise a thickness viewed in the cross section, wherein the thickness is less than a thickness of the at least a portion of the first section viewed in the cross section, and wherein the thickness is less than a thickness of the at least a portion of the second section viewed in the cross section.

In some embodiments, the thickness of the overlapping section may be less than one-half of the thickness of the at least a portion of the first section viewed in the cross section. Similarly, the thickness of the overlapping section may be less than one half of the thickness of the at least a portion of the second section viewed in the same cross section. In some embodiments, the second section may be configured to contact a second battery cell adjacent to the first battery cell. Similarly, in some embodiments, additional sections may be provided as desired to provide a protective plate with desired combination of protective and/or cooling features.

One or more such plates may be configured to at least reduce a force extending between adjacent battery cells during the predetermined conditions, such as a threshold force.

In some embodiments, a battery may be provided comprising a plurality of battery cells and one or more cooling plates positioned between adjacent battery cells among the plurality of battery cells. The cooling plate(s) may be configured to dissipate heat from the adjacent battery cells, and may further be configured to fail upon experiencing a threshold force so as to prevent at least a portion of the threshold force from being transferred between adjacent battery cells. The cooling plate(s) may comprise a first section in contact with a first battery cell and a second section in contact with a second battery cell.

In some embodiments, at least a portion of the first section may be offset from at least a portion of the second section such that, upon experiencing a threshold force or other predetermined conditions, the at least a portion of the first section is configured to shear away from the at least a portion of the second section. This may be configured such that the plate collapses or otherwise is reduced in width, permanently or temporarily, to absorb forces resulting from the predetermined conditions.

Of course, various other embodiments are contemplated that comprise additional plate sections. Such sections may, in some embodiments, alternate along a length of the battery and/or the cells of a battery such that every other plate section is in contact with one of two adjacent battery cells, and the corresponding set of plate sections are each in contact with the other of the two adjacent battery cells. Any number of plate sections may be used as desired, and as will be apparent to those of ordinary skill after having received the benefit of this disclosure.

One or more of the plate sections may be configured with one or more walls or other portions that may be offset from at least a portion of an adjacent section such that, upon experiencing the threshold force, the portion and/or wall is configured to shear away from the portion and/or wall of the corresponding adjacent section. For example, in some embodiments, a first section of a plate may extend towards a first battery cell along a first wall, and a second section of the plate may extend towards a second battery cell along a second wall of the second section. The first wall may be offset from the second wall such that the first section can slide towards the first battery cell and such that the second section can slide towards the second battery cell upon failure of the plate.

The first wall may be coupled to the second wall along an overlapping section. The overlapping section may be configured to shear upon failure of one or more portions of the plate. The overlapping section may be configured such that, upon failure of the plate, the first wall is allowed to contact the first battery cell and such that, upon failure of the plate, the second wall is allowed to contact the second battery cell. One or more of the overlapping sections may comprise a thickness that is less than one-half of the thickness of one or both of the walls/portions of the two adjacent plate sections.

In some embodiments, one or more of the battery plates may comprise cooling plates. For example, in some embodiments, one or more of the battery plates may comprise a plurality of windows for facilitating flow or air or another fluid to one or more of the adjacent battery cells. Of course, some embodiments may comprise a plurality of cooling plates, wherein a cooling plate is positioned between each of the adjacent battery cells of the battery. Each of the cooling plates may be configured to dissipate heat from its adjacent battery cells, and each of the cooling plates may be configured to fail upon experiencing a threshold force so as to prevent at least a portion of the threshold force from being transferred between its adjacent battery cells.

In some embodiments, a vehicle battery may comprise a plurality of battery cells and a plurality of cooling plates. A cooling plate may be positioned between each of the adjacent battery cells of the plurality of battery cells. Each of the plurality of cooling plates may comprise a plurality of openings for dissipating heat from adjacent battery cells. Each of the plurality of cooling plates may further comprise a first plate section positioned adjacent to a first battery cell and a second plate section positioned adjacent to a second battery cell opposite from the first battery cell. The first plate section may comprise a first wall extending towards the second battery cell, and the second plate section may comprise a second wall extending towards the first battery cell. The first wall may extend in a non-overlapping plane relative to the second wall and may interconnect with the second wall such that, upon experiencing a threshold force in at least substantially a direction towards the second battery cell, the first wall is configured to separate from the second wall.

In some embodiments, the first plate section of each of the plurality of cooling plates may further comprise a third wall extending towards the second battery cell. The second plate section of each of the plurality of cooling plates may further comprise a fourth wall extending towards the first battery cell. The third wall(s) may extend in a non-overlapping plane relative to the fourth wall(s) and may interconnect with the fourth wall(s) such that, upon experiencing a threshold force in at least substantially a direction towards the second battery cell, the third wall(s) is configured to separate from the fourth wall(s). The first wall(s) may interconnect with the second wall(s) along an overlapping section such that the first wall(s) extends along and adjacent to the second wall(s) along the overlapping section.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

A detailed description of apparatus consistent with various embodiments of the present disclosure is provided below. While several embodiments are described, it should be understood that the disclosure is not limited to any of the specific embodiments disclosed, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure will be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

Embodiments of the apparatus disclosed herein may be used to protect and/or cool battery cells. Some embodiments may be particularly useful in connection with vehicle batteries comprising a series of battery cells. Some embodiments may be used to provide protection by, for example, being configured to fail under certain conditions to prevent excessive forces from being transferred to one or more battery cells within the battery. More specific embodiments will now be described in greater detail with reference to the accompanying drawings.

Figure 1:
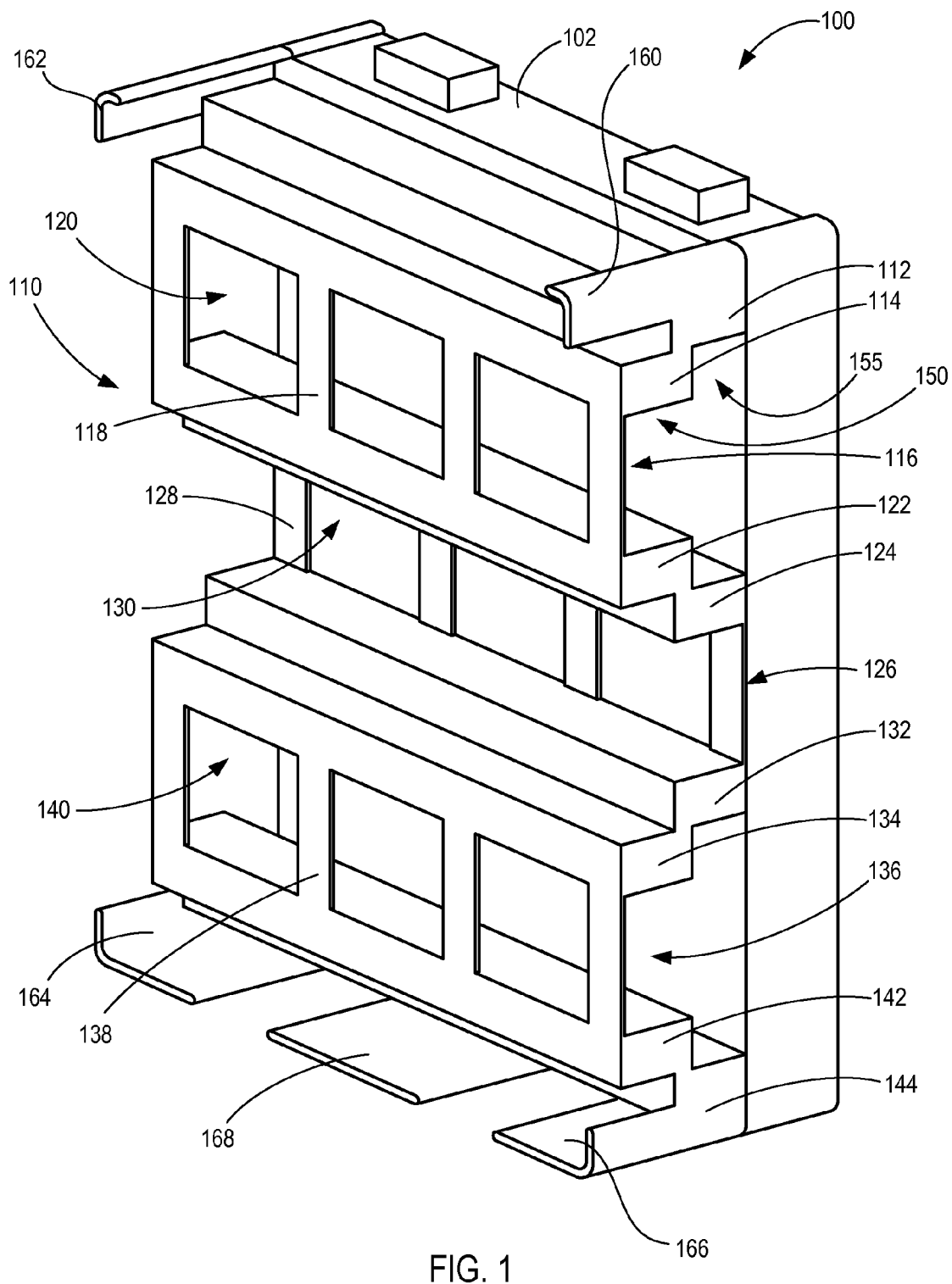
FIG. 1 is a perspective view of an embodiment of a battery comprising a protective cooling plate.

FIG. 1 is a perspective view of an embodiment of a battery 100 comprising a protective cooling plate 110. Battery 100 comprises a battery cell 102. As those of ordinary skill in the art will appreciate, although only a single battery cell 102 is depicted in FIG. 1, battery 100 may comprise a plurality of battery cells. Each of the various adjacent battery cells 102 may comprise a protective cooling plate 110 positioned therebetween. As discussed elsewhere herein, in some embodiments, plate 110 may comprise a protective plate that does not also serve a cooling function.

As illustrated in FIG. 1, plate 110 may comprise a plurality of plate sections. In the depicted embodiment, plate 110 comprises plate sections 112, 114, 116, 122, 124, 126, 132, 134, 136, 142, and 144. Plate sections 112, 124, 126, 132, and 144 are each positioned adjacent to battery cell 102. In the depicted embodiment, plate sections 112, 124, 126, 132, and 144 are each configured to contact battery cell 102, although alternative embodiments are contemplated in which this may not be the case. Plate sections 114, 116, 122, 134, 136, and 142 are each configured to be positioned adjacent to a battery cell (not shown in FIG. 1) opposite from battery cell 102.

Plate 110 also comprises a series of brackets configured to receive an adjacent battery cell opposite from battery cell 102. More particularly, battery plate 110 comprises bracket pieces 160 and 162 positioned along opposite corners of the top portion of plate 110. Similarly, battery plate 110 comprises bracket pieces 164 and 166 positioned along opposite corners of the top portion of plate 110. Finally, battery plate 110 further comprises a center bracket piece 168 extending from a central portion of the bottom of plate 110. As those of ordinary skill in the art will appreciate, in embodiments comprising such brackets, a wide variety of alternatives are possible. For example, in some embodiments, one or more brackets may also extend in the opposite direction to receive battery cell 102. In addition, a wide variety of shapes, sizes, numbers, locations, and configurations may be used. The brackets may be integrally formed with plate 110 or, alternatively, may be attached to plate 110 by any suitable fastener, adhesive, or the like.

Sections 112, 114, 122, 124, 132, 134, 142, and 144 each comprise walls extending towards a battery cell opposite from the cell with which it is adjacent and/or contacts. Each of walls 112, 114, 122, 124, 132, 134, 142, and 144 is also positioned to extend in a non-overlapping plane relative to an adjacent section such that, upon experiencing a threshold force in at least substantially a direction towards the one or both of the adjacent battery cells, the adjacent sections/walls separate from one another, as described in greater detail below.

In addition, each of walls 112, 114, 122, 124, 132, 134, 142, and 144 interconnects with an adjacent wall extending from an opposite battery cell along an overlapping section such that each of walls 112, 114, 122, 124, 132, 134, 142, and 144 extends along and adjacent to another of walls 112, 114, 122, 124, 132, 134, 142, and 144 along the overlapping section.

In addition, three of the sections of plate 110 comprise windows for facilitating passage of air or another cooling fluid to one or both of the adjacent battery cells. More particularly, section 116 comprises a plurality of windows 120 defined by a plurality of walls 118 extending between sections 114 and 122. Similarly, section 126 comprises a plurality of windows 130 defined by a plurality of walls 128 extending between sections 124 and 132. And section 136 comprises a plurality of windows 140 defined by a plurality of walls 138 extending between sections 134 and 142.

The various sections of plate 110 also define a series of passages extending along the faces of the adjacent battery cells to further facilitate a desired passage of a cooling fluid therethrough. For example, a first passage 150 is defined between sections 114 and 122 and an adjacent second passage 155 is defined between sections 112 and 124. Passages 150 and 155 are interconnected. However, alternative embodiments are contemplated in which such adjacent passages may be either partially or wholly separated from one another.

Figure 2:
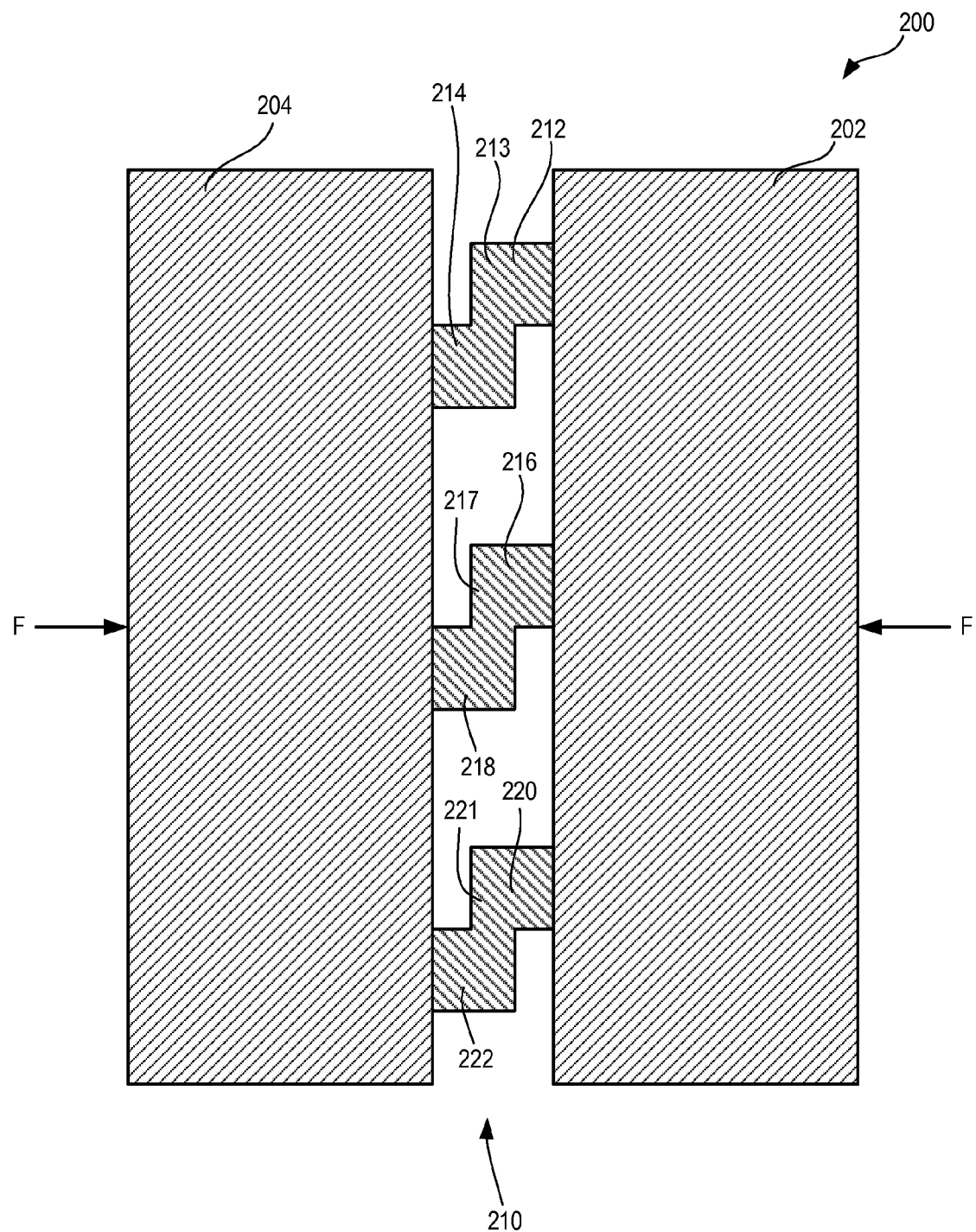
FIG. 2 is a cross-sectional view depicting the interconnection between adjacent plate sections of an embodiment of a protective plate positioned between two adjacent battery cells.

FIG. 2 is a cross-sectional view of an embodiment of a battery 200 comprising at least two adjacent battery cells, namely, battery cell 202 and battery cell 204. Although not depicted, it should be understood that battery 200 may further comprise other battery cells. Battery 200 also comprises a plate 210 comprising a plurality of plate sections, namely, plate sections 212, 214, 216, 218, 220, and 222. Although not depicted, it should be understood that battery 200 may further comprise other plates and/or plate sections as desired.

Plate sections 212, 216, and 220 each extends from adjacent to battery cell 202 towards battery cell 204. Similarly, plate sections 214, 218, and 222 each extends from adjacent to battery cell 204 towards battery cell 202. FIG. 2 depicts the interconnection between adjacent plate sections of plate 210. As can be seen in the figure, each of the adjacent plate sections of plate 210 extends in a non-overlapping plane relative to an adjacent section such that, upon experiencing a threshold force in at least substantially a direction towards the one or both of the adjacent battery cells 202 and 204, the adjacent sections are configured to separate from one another by collapsing plate 210 and allowing the adjacent plate sections to sever and travel towards the battery cell to which they originally extend.

More particularly, plate sections 212 and 214 are interconnected by an overlapping section 213. Similarly, plate sections 216 and 218 are interconnected by overlapping section 217, and plate sections 220 and 222 are interconnected by overlapping section 221. However, although the various adjacent plate sections overlap vertically so as to interconnect them, as can also be seen in FIG. 2, each of the various adjacent plate sections do not overlap horizontally. In other words, each section extends from one cell of battery 200 to an opposite cell of battery 200 in a non-overlapping plane relative to an adjacent section with which it interconnects. In this manner, once the overlapping section is broken by a sufficient force (such as is depicted by arrows "F" in FIG. 2), the two adjacent plate sections can slide with respect to one another to collapse the plate 210 and thereby absorb some of the force that would otherwise be transferred to cells 202 and/or 204 and may result in damage to such cells.

Figure 3:
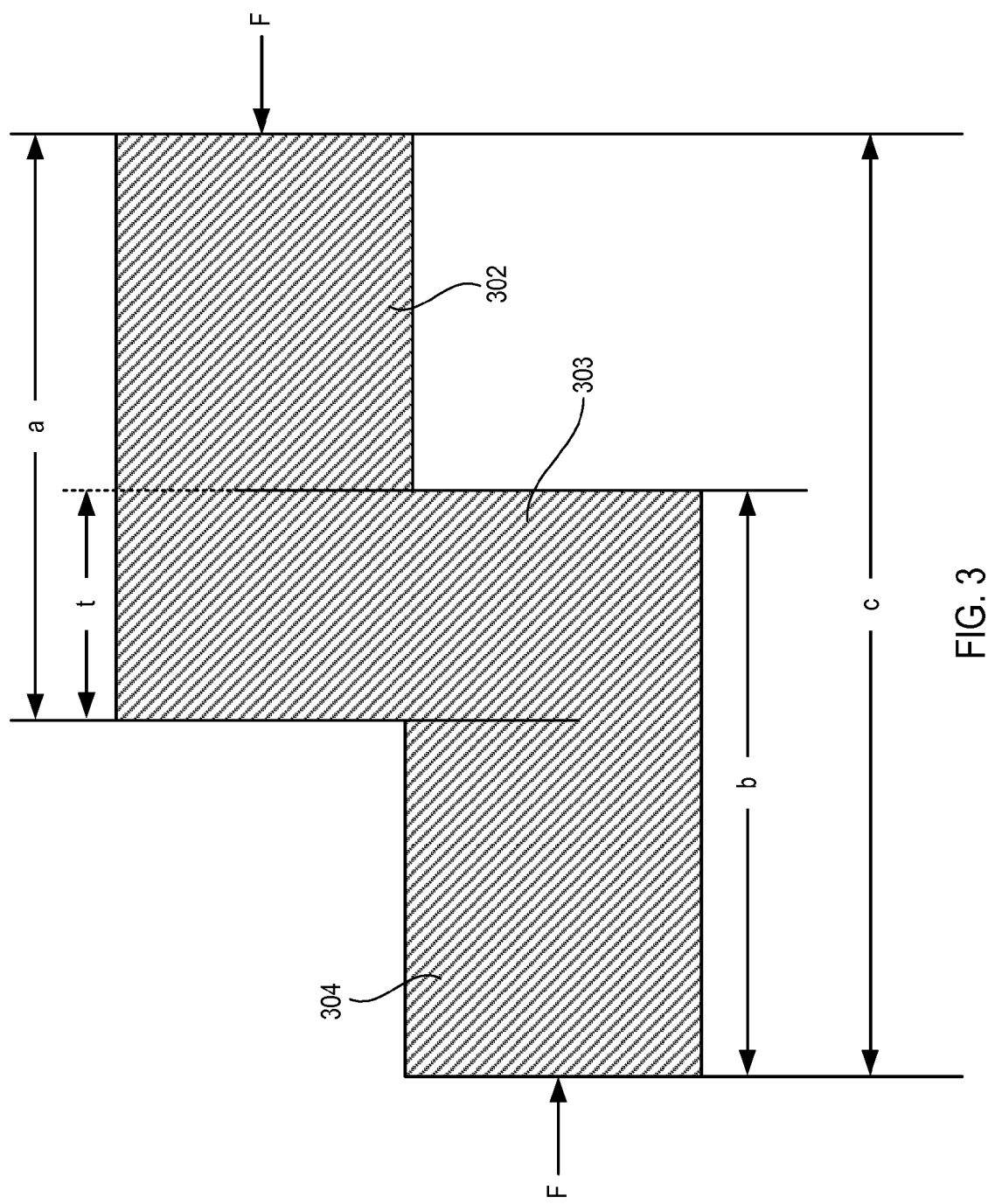
FIG. 3 is a cross-sectional view depicting certain dimensional parameters of interconnecting walls and an overlapping section of an embodiment of a protective plate.

FIG. 3 is a cross-sectional view of two adjacent plate sections 302 and 304 interconnected by an overlapping section 303 according to one embodiment of a protective battery plate. FIG. 3 depicts certain dimensional parameters of these components of the depicted embodiment of a battery plate.

More particularly, plate section 302 comprises a length "a", plate section 304 comprises a length "b," and overlapping section 303 comprises a length or thickness "t." The combined length of sections a and b subtracting the overlapping section thickness t is equal to length "c."

In some embodiments, dimensions a and b may be the same, or at least substantially identical. In such embodiments, dimension c would be equal to $2a-t$. Each of these dimensions may be selected according to the desired characteristics of the battery plate, which may depend upon the materials used to form the plate. Each of these dimensions may be selected according to the desired characteristics of the battery and battery plate and will be apparent to those of ordinary skill after having received the benefit of this disclosure. These dimensions may depend upon, for example, the materials selected to form the plate. These dimensions may also depend upon, for example, other design choices, such as the size of the battery and/or the amount of air desired to pass in between the battery cells (for cooling plate embodiments).

As shown by the arrows in FIG. 3, a sufficient force directed at least substantially perpendicular to a surface of one or both of the adjacent battery cells may cause the overlapping section 303 to fail and/or shear. In some embodiments, dimension "c" may define, or at least substantially define, the distance between adjacent battery cells. In such embodiments, an amount of possible deformation or collapse of the plate may be defined by c—the larger of the two dimensions a and b. In embodiments in which a=b, the amount of possible deformation or collapse of the plate is $c-a$ (or $c-b$).

Each of these various dimensions may be selected based upon the materials used to form the plate and desired characteristics of the plate, such as a desired amount of force absorption. In some embodiments, the material used may be, for example, polypropylene, noryl, or any other suitable material preferably being non-conductive, or at least substantially non-conductive, and rigid to allow for shearing/failure, as discussed above, such as plastics, fiber composites, and the like.

To give some specific examples, the collapsing dimension, which, as described above, in embodiments consistent with FIG. 3 may be c—the larger of the two dimensions a and b. The thickness "t" of the overlapping section 303 may be within a range of about 1 mm to about 3 mm for polypropylene and may be within a range of about 0.25 mm to about 0.75 mm for noryl.

Of course, the desired thickness t of the overlapping section 303 depends upon the desired threshold for overloading conditions that lead to failure/shearing of the battery plate. For example, in some embodiments that may be particularly useful in connection with vehicle batteries, the threshold force for triggering collapse of the battery plate(s) may be within a range of about 10 kN and about 20 kN.

The foregoing specification has been described with reference to various embodiments. However, one of ordinary skill in the art will appreciate that various modifications and changes can be made without departing from the scope of the present disclosure. For example, various operational steps, as well as components for carrying out operational steps, may be implemented in alternate ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Those having skill in the art will appreciate that many changes may be made to the details of the above-described embodiments without departing from the underlying principles of the invention. The scope of the present invention should, therefore, be determined only by the following claims.

The invention claimed is:

1. A battery, comprising:
 a plurality of battery cells; and
 a cooling plate positioned between at least two adjacent battery cells among the plurality of battery cells, wherein the cooling plate comprises a first section in contact with a first battery cell and a second section in contact with a second battery cell, wherein the cooling plate is configured to dissipate heat from the at least two adjacent battery cells, wherein the cooling plate is configured to fail upon experiencing a threshold force so as to prevent at least a portion of the threshold force from being transferred between the at least two adjacent battery cells, wherein the cooling plate is configured to fail upon experiencing the threshold force by at least partially shearing at least a first portion of the cooling plate relative to at least a second portion of the cooling plate, wherein at least a portion of the first section is offset from at least a portion of the second section such that, upon experiencing the threshold force, the at least a portion of the first section is configured to shear away from the at least a portion of the second section, wherein the first section extends towards the second battery cell along a first wall, wherein the second section extends towards the first battery cell along a second wall, and wherein the first wall is offset from the second wall such that the first section can slide towards the second battery cell and such that the second section can slide towards the first battery cell upon failure of the cooling plate.

2. The battery of claim 1, wherein the cooling plate further comprises a third section in contact with the first battery cell.

3. The battery of claim 2, wherein at least a portion of the third section is offset from at least a second portion of the second section such that, upon experiencing the threshold force, the at least a portion of the third section is configured to shear away from the at least a second portion of the second section.

4. The battery of claim 1, wherein the first wall is coupled to the second wall along an overlapping section, and wherein the overlapping section is configured to shear upon failure of the cooling plate.

5. The battery of claim 4, wherein the overlapping section is configured such that, upon failure of the cooling plate, the first wall is allowed to contact the second battery cell and such that, upon failure of the cooling plate, the second wall is allowed to contact the first battery cell.

6. The battery of claim 1, wherein the cooling plate further comprises a first plurality of windows for facilitating air flow to the first battery cell, and a second plurality of windows for facilitating air flow to the second battery cell.

7. The battery of claim 1, further comprising a plurality of cooling plates, wherein a cooling plate is positioned between each of the adjacent battery cells among the plurality of battery cells, and wherein each of the cooling plates is configured to dissipate heat from its adjacent battery cells, and wherein each of the cooling plates is configured to fail upon experiencing a threshold force so as to prevent at least a portion of the threshold force from being transferred between its adjacent battery cells.

8. The battery of claim 1, wherein the cooling plate is configured to fail upon experiencing the threshold force by fully shearing the first portion of the cooling plate relative to the second portion of the cooling plate.

9. The battery of claim 1, wherein the cooling plate is configured to fail upon experiencing the threshold force by collapsing such that the cooling plate has a first thickness prior to experiencing the threshold force and such that the cooling plate has a second thickness after experiencing the threshold force, wherein the first thickness is greater than the second thickness.

* * * * *